US007177877B2

(12) United States Patent
Nuyens et al.

(10) Patent No.: US 7,177,877 B2
(45) Date of Patent: Feb. 13, 2007

(54) METHOD AND SYSTEM FOR EXTERNALIZING CONDITIONAL LOGIC FOR COLLECTING MULTI-PURPOSE OBJECTS

(75) Inventors: Erik D. Nuyens, Deurne (BE); Edwin M. E. Dhondt, Brecht (BE); Stefan P. M. Poppe, Deurne (BE)

(73) Assignee: Electronic Data Systems Corporation, Plano, TX (US)

( * ) Notice: Subject to any disclaimer, the term of this patent is extended or adjusted under 35 U.S.C. 154(b) by 548 days.

(21) Appl. No.: 10/447,354

(22) Filed: May 29, 2003

(65) Prior Publication Data

US 2004/0243587 A1 Dec. 2, 2004

(51) Int. Cl.
*G06F 7/00* (2006.01)
*G06F 17/30* (2006.01)
*G06F 12/10* (2006.01)
*G06F 13/00* (2006.01)
*G06F 13/28* (2006.01)

(52) U.S. Cl. .............................. 707/102; 707/3; 707/4; 707/6; 711/110

(58) Field of Classification Search ................ 707/102, 707/3, 4, 6; 711/110
See application file for complete search history.

(56) References Cited

U.S. PATENT DOCUMENTS 5,029,080 A * 7/1991 Otsuki ........................ 712/201

FOREIGN PATENT DOCUMENTS

EP 0 841 627 A2 5/1998

OTHER PUBLICATIONS

Naughton & Schildt, The Complete Reference Java 1.1, 2nd edition, Osborne McGraw-Hill, p. 104, 1998.*
Jorgensen et al., Communications of the ACM, vol. 37, No. 9, pp. 30-38, 1994.*
D. Moreto et al., "Evaluating Composite Events Using Shared Trees", IEE Proceedings: Software, IEE, Stevenage, GB, vol. 148, No. 1, Feb. 26, 2001, pp. 1-10.

* cited by examiner

*Primary Examiner*—Tim Vo
*Assistant Examiner*—Cheyne D. Ly
(74) *Attorney, Agent, or Firm*—Munck Butrus P.C.

(57) ABSTRACT

A method and system for externalizing conditional logic for an integrated programming architecture provides a static tree structure traversed by a dynamic object collector. The tree structure includes a plurality of conditional nodes and a plurality of branches for testing at least one conditional statement. Each conditional node associates with one conditional object for testing conditional statements and one or more aspect objects. The plurality of branches establishes sequential links between a first conditional node and later conditional nodes. Evaluation instructions evaluate conditional statements relative to the conditional object. An object collector is instantiated for a particular set of data, such as a business event. Upon instantiation, the object collector cache and collected objects set is empty. Object collector traverses tree structure according to the evaluation result of the condition objects of the encountered condition nodes. Object collector evaluates this condition.

19 Claims, 7 Drawing Sheets

| | CONTENTS OF SOURCE MESSAGE | CONDITIONS/ EXPRESSIONS EVALUATED | OBJECTS COLLECTED |
|---|---|---|---|
| BE1 | COUNTRY=BE | COUNTRY=US OR COUNTRY=BE:TRUE | targettype_1a |
| | AMOUNT=200 | AMOUNT*PERCENT>0:TRUE | targettype_1b |
| | PERCENT=10% | | targettype_2 |
| | STATUS=OPEN | STATUS=OPEN | targettype_4 |
| BE2 | COUNTRY=UK | COUNTRY=US OR COUNTRY=BE:FALSE | targettype_3 |
| BE3 | COUNTRY=BE | COUNTRY=US OR COUNTRY=BE:TRUE | targettype_1a |
| | AMOUNT=100 | | targettype_1b |
| | PERCENT=0% | AMOUNT*PERCENT>0:FALSE | |
| | STATUS=CLOSED | STATUS=CLOSED | targettype_5 |

| | TIMES OF EVALUATION | | | |
|---|---|---|---|---|
| COMPOSITE | C1 | C2 | TOTAL | EXPLANATION |
| C1 AND C2 | 100 | 90 | 190 | SINCE p(C1)=0.9, C2 WILL NEED TO BE EVALUATED IN 90% OF THE CASES |
| C2 AND C1 | 30 | 100 | 130 | |
| C1 OR C2 | 100 | 10 | 110 | SINCE p(C1)=0.9, C2 WILL ONLY NEED TO BE EVALUATED WHEN C1 IS FALSE, ie IN 10% OF THE CASES |
| C2 OR C1 | 70 | 100 | 170 | |

FIG. 14

| SIMPLE CONDITIONS | | | DERIVED CONDITIONS | CACHED CONDITIONS | EXPLANATION |
|---|---|---|---|---|---|
| C3 | C4 | C5 | C2 | C1 | | |
| T | N/A | T | T | T | C3; C2; C5; C1 | WHEN C3 EVALUATES TO TRUE, THERE'S NO NEED TO EVALUATE C4. SINCE C2 EVALUATES TO TRUE, C5 NEEDS TO BE EVALUATED AS WELL |
| F | T | T | T | T | C3; C4; C2; C5; C1 | |
| F | F | N/A | F | F | C3; C4; C2; C1 | C4 NEEDS TO BE EVALUATED, SINCE C3 EVALUATES TO FALSE. SINCE C2 EVALUATES TO FALSE, THERE'S NO NEED TO EVALUATE C5 | ns
METHOD AND SYSTEM FOR EXTERNALIZING CONDITIONAL LOGIC FOR COLLECTING MULTI-PURPOSE OBJECTS

TECHNICAL FIELD OF INVENTION

The invention, in general, relates to a method and system for externalizing conditional logic for collecting multi-purpose objects.

BACKGROUND OF THE INVENTION

As enterprises continue to grow and merge, the need for companies to share information from diverse applications, databases and legacy systems becomes critical. At the same time, companies desire to use existing information technology resources while retaining a significant degree of compatibility with emerging technologies. Processes which address these and related concerns are known as enterprise architecture integration or "EAI" processes. EAI addresses the problem that enterprises, customers, partners and suppliers have incompatible systems in place which do not promote collaboration and sharing of information. When people, business processes and technologies in enterprises are not fully integrated as a result of business transitions, such as mergers and acquisitions, enterprises must try to meld different legacy systems into one integrated system. The result of an inability to do this effectively can be that business performance and performance improvements cannot coordinate across multiple enterprises.

In order to meet EAI process objectives, companies seek to link or integrate disparate information sources and business processes and systems including legacy Enterprise Resource Planning (ERP), Customer Relationship Management (CRM), and Software Configuration Management (SCM) systems, from multiple data sources and other proprietary business solutions. The integration technology must provide tools for the design, deployment, customization and maintenance of integrated solutions. The technology should permit maximum deployment flexibility and connectivity options, as well as support a wide range of platforms, operating systems and databases. Moreover, the integration technology should include support for interoperability with a variety of messaging and application management technologies.

Enterprise information technology infrastructures consist of an applications layer deployed on top of networking and compute layers. While the underlying standardized layers have matured to high levels of operational and cost efficiencies, integrating applications have been riddled with several issues currently being worked on by system integrators and EAI vendors. A critical challenge is how to move from the existing environment towards a more flexible and cheaper environment while maintaining business continuity.

Other limitations are that existing systems are designed very generically. Most EAI packages design all of the different types of events into their record structure. Unfortunately, for many applications, such as in the financial industry, this does not work because events change dynamically and the associated core processing must be dynamically changeable. For example, business logic is often buried as code in applications. When business requirements change, unfortunately, the associated application software must also change. To make such changes is costly, time consuming and difficult. The need for a fast and cost-effective response to market changes, however, is of paramount importance for market success in integrating applications.

Therefore, there is a need for fast and low-cost business logic adaptation capabilities.

Moreover, a need exists for a logic adaptation method and system using an open architecture that allows flexible adaptation to new conditions and new expressions in dynamic changes to external events.

A further need exists for a way to respond to advances in application programs and external events that not only have use in the case of business logic, such as in the financial services industry, but also in a wide variety of other industries, as well.

SUMMARY OF THE INVENTION

In accordance with the present invention, a method and system for externalizing conditional logic for collecting multi-purpose objects is provided that substantially eliminates or reduces the disadvantages and problems associated with prior methods and systems for addressing changes in application programs.

According to one aspect of the present invention, there is provided a method and system for externalizing conditional logic for an integrated programming architecture. The present invention provides a tree structure within the memory of a core processing engine. The in-memory tree structure holds on to a plurality of objects for use within an application program. The tree structure includes a plurality of condition nodes and a plurality of branches for testing at least one conditional statement. A condition node is associated with a condition object for testing conditional statements. The plurality of branches establishes sequential links between a first condition node and later condition nodes. An object collector is instantiated for a set of facts (e.g. data) and traverses the tree structure. While traversing the tree structure, the object collector collects multi-purpose objects. The evaluation result of each visited node's condition determines the path taken by the object collector, since the evaluation result determines which branch the object collector follows.

One of many applications of the present invention is splitting a business event. For example, the present invention may provide a condition node tree for determining the objects, such as target event types for correctly splitting the given business event. The splitting process allows every transaction, such as a withdrawal from an account, to appropriately generate individual and organizational consequences. An individual consequence may be, for example, the need to provide the individual's account number, the currency in which the transaction will be conducted, and the transaction amount. The organizational consequence of the business event is to record the event on different types of balances in a wide variety of integrated applications. The present invention provides for an efficient method of splitting the business event into the appropriate number of sub-events. The present invention, in this way, enables a core processing engine to extract dense behavior from a previously coded software application.

A technical advantage of the present invention is a rule engine that can be re-tuned from outside an associated software application. As a result, the present invention requires no recoding or no replacement of software in the associated business applications. The present invention efficiently provides an ability to re-tune the associated core processing engine based on changing parameters at run time.

For example, the present invention provides the ability to evaluate a condition once and, in response to the evaluation, make appropriate processing changes. Once the evaluation occurs, the present invention thereafter avoids the need for condition re-evaluation.

Another technical advantage of the present invention is a highly flexible and adaptable conditional tree logical evaluation structure. The present invention provides, not only the ability to evaluate TRUE-FALSE conditions, but also IF-THEN-ELSE logic structures. Moreover, the present invention provides within the tree structure a switching function. This permits the tree-like structure to mimic the logic of an application program without having to hard code the logic inside an associate business software application.

A further technical advantage is that the present invention is open and allows for the flexible addition of new condition operators and new expression operators. This permits adding further features and logical operations as they arise for different applications.

Still another technical advantage of the present invention is that it is lightweight, preferably including a number of Java classes that may be configured by means of an XML file. This permits a high degree of flexibility both in the determination of the target events, as well as in the use of transformation logic.

Other technical advantages are readily apparent to one skilled in the art from the following figures, description, and claims.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF PREFERRED EMBODIMENT

The preferred embodiment of the present invention and its advantages are best understood by referring to FIGS. 1 through 16 of the drawings, like numerals being used for like and corresponding parts of the various drawings.

Figure 1:
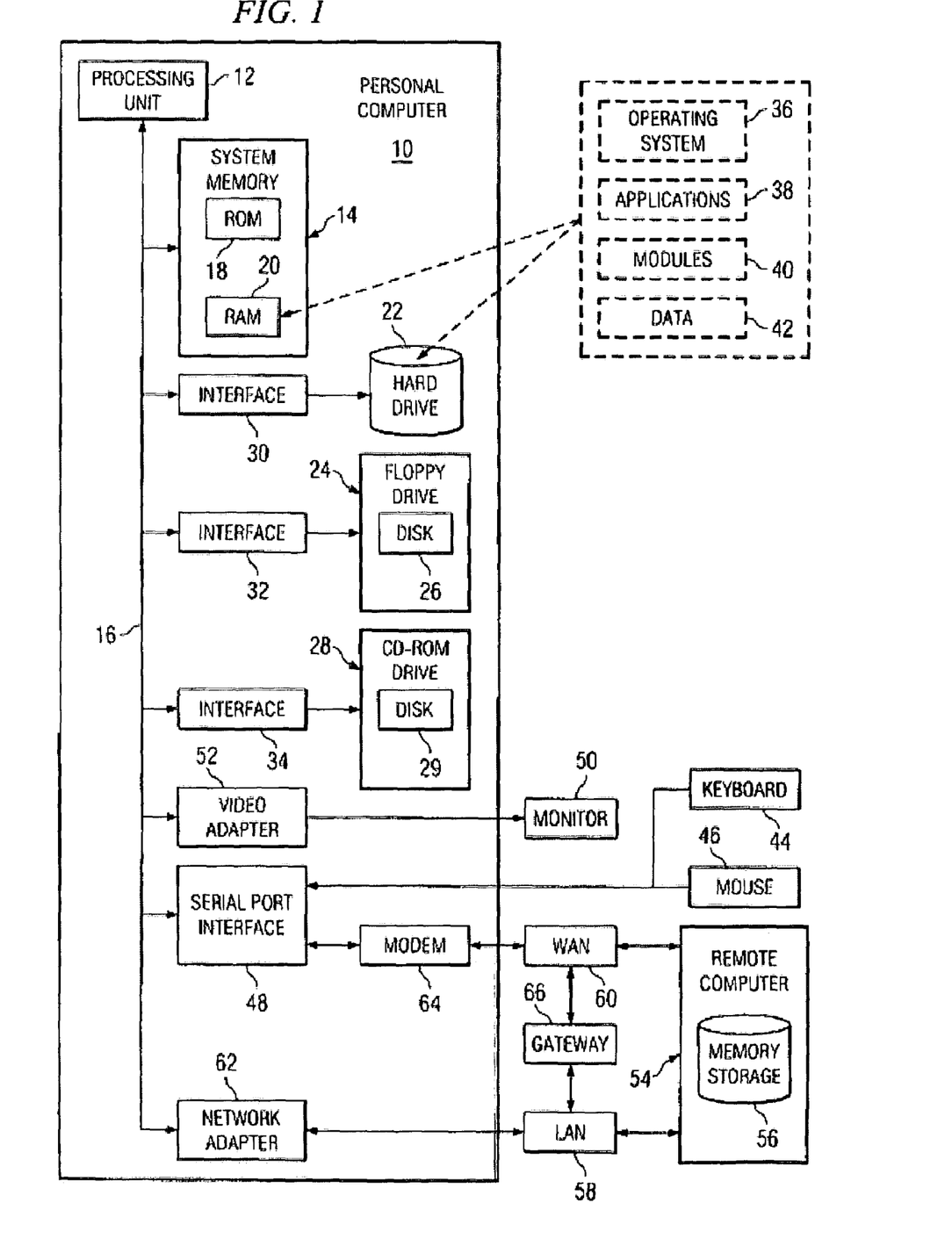
FIG. 1 illustrates a general purpose computer that may be used to implement the processes and functions of externalizing conditional logic according to the teachings of the present invention.

FIG. 1 illustrates a general-purpose computer 10 that may be used in a personal computer operating system which may be used as a stand-alone computer or as part of a larger, networked system of personal computers. Here, FIG. 1 provides an understanding of how one might interface with and use the system of the present invention. While the invention will be described in the general context of computer-executable instructions of a program that runs on a computer, those skilled in the art will recognize that the invention also may be implemented in combination with other program modules.

Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 10 (such as personal computers, laptops, palmtops, set tops, servers, mainframes, and other variety computers), including a processing unit 12, system memory 14, and system bus 16 that couples various system components including system memory 14 to the processing unit 12. Processing unit 12 may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 12.

System bus 16 may be any of several types of bus structure including a memory bus or memory controller, a peripheral bus, and a local bus using any of a variety of conventional bus architectures such as PCI, VESA, AGP, Microchannel, ISA and EISA, to name a few. System memory 14 includes read only memory (ROM) 18 and random access memory (RAM) 20. A basic input/output system (BIOS), containing the basic routines that help to transfer information between elements within the computer 10, such as during start-up, is stored in ROM 18.

Computer 10 further includes a hard disk drive 22, a floppy drive 24, e.g., to read from or write to a removable disk 26, and CD-ROM drive 28, e.g., for reading a CD-ROM disk 29 or to read from or write to other optical media. The hard disk drive 22, floppy drive 24, and CD-ROM drive 28 are connected to the system bus 16 by a hard disk drive interface 30, a floppy drive interface 32, and an optical drive interface 34, respectively. The drives and their associated computer-readable media provide nonvolatile storage of data, data structures, computer-executable instructions, etc. for computer 10. Although the description of computer-readable media provided above refers to a hard disk, a removable floppy and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 20, including an operating system 36, one or more application programs 38, other program modules 40, and program data 42. A user may enter commands and information into the computer 10 through a keyboard 44 and pointing device, such as a mouse 46. Other input devices (not shown) may include a microphone, joystick, game pad, satellite dish, scanner, or the like. These and other input devices are often connected to the processing unit 12 through a serial port interface 48 that is coupled to the system bus, but may be connected by other interfaces, such as a parallel port, game port or a universal serial bus (USB). A monitor 50 or other type of display device is also connected to the system bus 16 via an interface, such as a video adapter 52. In addition to the monitor, computers typically include other peripheral output devices (not shown), such as speakers and printers.

Computer 10 may operate in a networked environment using logical connections to one or more remote computers, such as a remote computer 54. The remote computer 54 may be a server, a router, a peer device or other common network node, and typically includes many or all of the elements described relative to the computer 10, although only a memory storage device 56 has been illustrated in FIG. 1. The logical connections depicted in FIG. 1 include a local area network (LAN) 58 and a wide area network (WAN) 60. Such networking environments are commonplace in offices, enterprise-wide computer networks, intranets and the Internet.

When used in a LAN networking environment, the computer 10 is connected to the LAN 58 through a network interface or adapter 62. When used in a WAN networking environment, computer 10 typically includes a modem 64 or other means for establishing communications (e.g., via the LAN 58 and a gateway or proxy server) over the wide area network 60, such as the Internet. Modem 64, which may be internal or external, is connected to the system bus 16 via the serial port interface 48. In a networked environment, program modules depicted relative to the computer 10, or portions thereof, may be stored in the remote memory storage device 56. It will be appreciated that the network connections shown are exemplary and other means of establishing a communications link between the computers may be used.

The present invention provides an independent or isolatable engine for collecting objects, and does not necessarily operate in association with any particular business or other related component. However, to more fully explain a practical context for implementing the teachings of the present invention, FIG. 2 shows an EAI framework which may drive meaningful benefits of the present invention's technical advantages.

Figure 2:
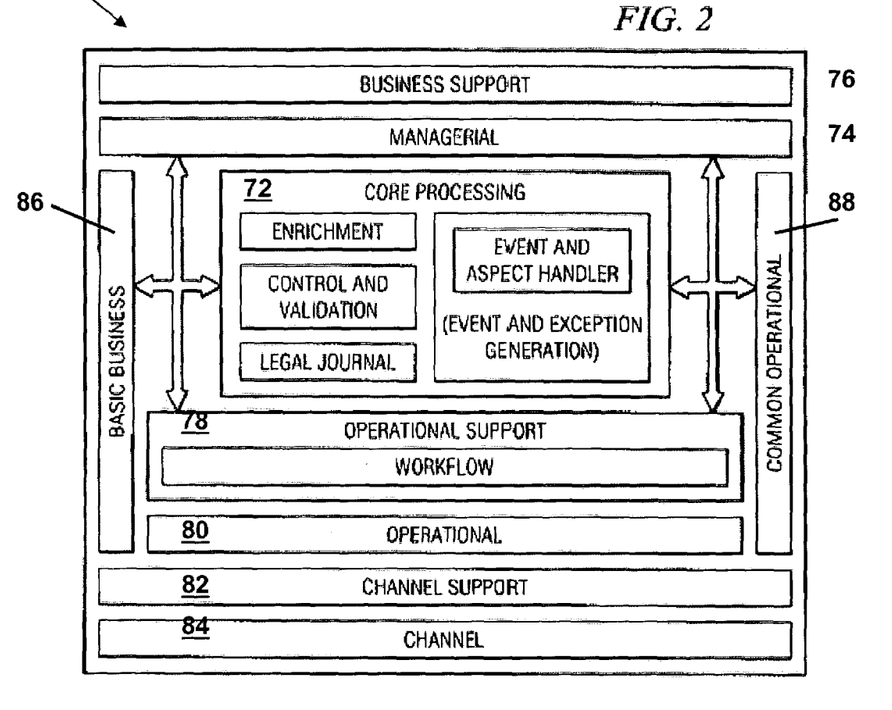
FIG. 2 conceptually shows an integrated enterprise architecture including a core processing engine as one way of implementing the teachings of the present invention.

FIG. 2, therefore, conceptually shows integrated enterprise architecture 70 as including a core processing engine 72 in which the object collector of the present invention may operate. Enterprise business architecture 70 reflects operations for accomplishing particular business objectives. Enterprise architecture 70 relates to an enterprise's organizational structure, business processes, workflow scenarios, business concepts, IT investment and expenditure profile, and the enterprise operating environment within which they all exist. Processing environment 70 includes an interface between core processing engine 72 and managerial applications 74 and business support applications 76. Core processing engine 72 is supported by operational support applications 78, which further relate to operational applications 80. Associated with operational applications 80 are channel support applications 82 which communicate with different channels 84 within enterprise architecture 70. On a functional basis, core processing engine 72 also interfaces and communicates with basic business applications 86 and common operational applications 88. Core processing engine 72 still further interfaces with operational support applications 78, which provide workflow support for operational applications 80.

Managerial applications 74 include applications for different managerial reports and functions, such as financial management and reporting, enterprise asset fund management, sales and marketing processing, risk analysis, and performance management. These applications also interface with the various business processes of business support applications 76, such as those processes for measuring and recording fixed assets, inventory logistics, human resource management aspects, procurement services, service management and archiving necessary for business support.

The operational processes of operational support applications 78 may include different process for supporting workflow between operational applications 80 and core processing engine 72. Operational applications 80 also provide different functions such as trade finance, leasing, input system, asset portfolio management, pay and receiving functions, trading and dealing and global custody of information and resources. Moreover, different operational applications may include programs for collateral and credit factoring processing, as well as different types of processes for insurance functions, deposit accounts, trust accounts, and securities handling.

At channel support layer 82, different interfaces and processing facilities support various aspects of operational layer 80. This may include user assistance applications for security audit functions as well as providing a portal into the operational aspects of the enterprise. Moreover, the enterprise resource management, custom resources management, personalization and IO handling functions using channel support applications 82. Paper handler functions, printing and imaging, all are supported by channel support applications 82 with communication being assisted via self-service or e-commerce transactions at channel applications 84.

Basic business applications 86 may include such business software as involved party, agreement support, asset, and financial instrument applications. Moreover, common operational applications 88 may provide the different financial applications for the enterprise, such as those providing clearing information, customer ledger, bank and settlement balances, accrual and general ledger functions.

As may be seen with the many application in an enterprise architecture 70, the advantages of the present invention of providing flexible adaptation to new conditions and new expressions as dynamic changes occur ins important. Moreover, the present invention, it should be clear that applications in environments are potentially quite different from the business logic environments of enterprise architecture 70. That is, the present invention has application in essentially any set of applications that use a core processing engine.

Figure 3:
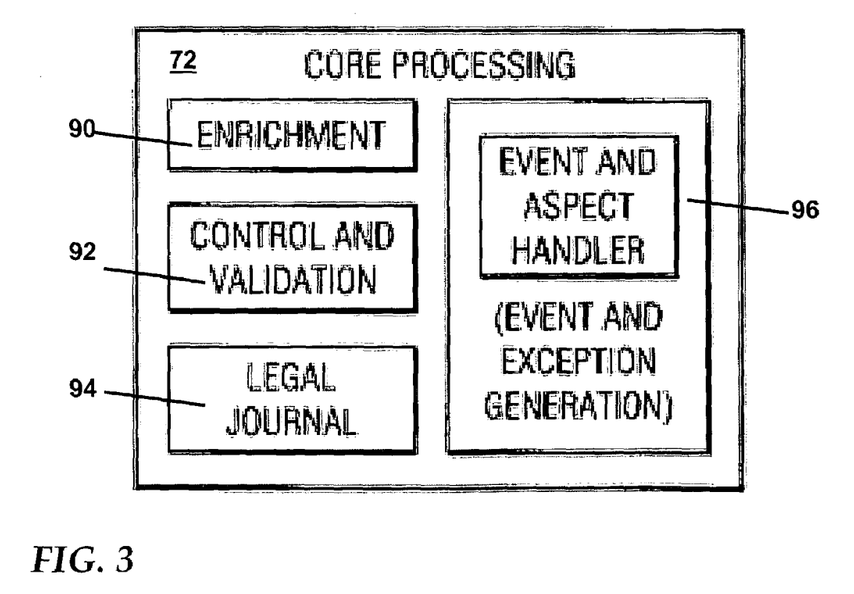
FIG. 3 depicts relevant components of a core processing engine from the integrated enterprise architecture of FIG. 2 for using the present invention.
Figure 4:
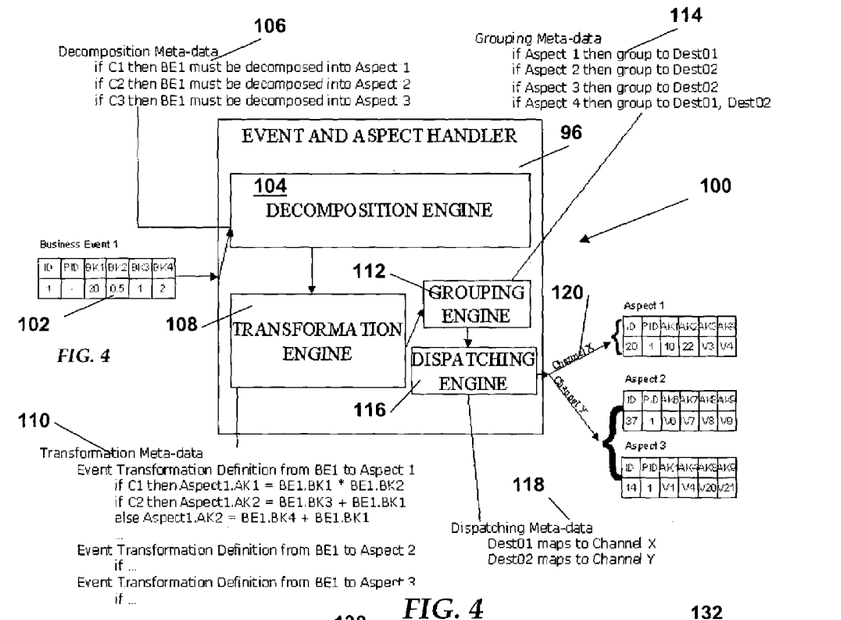
FIG. 4 shows in further detail the processing flow of the event and aspect handler of the core processing engine of FIG. 3.

FIG. 3 depicts relevant components of core processing engine 72 from integrated enterprise architecture 70. Core processing engine 72 includes within it the functions of enrichment functions 90, control and validation functions 92, legal journal function 94, as well as event and handler functions 96. FIG. 4 shows a high-level flow diagram 100 of the event and aspect handler 96, such as in core processing engine 72 of FIG. 3, for handling a business event 102. In this particular scenario, a business event 1 is provided to the event and aspect handler 96. In this process, decomposition engine 104 uses decomposition meta-data 106 to determine the target aspect types for business event 1. Secondly, the determined target aspect types 106, as well as business event 102 itself are provided to the transformation engine 108. Transformation engine 108 uses transformation meta-data 110 to transform business event 1 into aspects of the provided aspect types. Thirdly, the produced aspects 110 are given to grouping engine 112, which uses grouping meta-data 114 to group the given aspects 110 according to their respective logical destination. The destination-grouped aspects are then provided to the dispatching engine 116, which uses dispatching meta-data 118 to map the logical destination of each group of aspects to a physical channel 120 and put each group of aspects as a whole on its associated channel.

Figure 5:
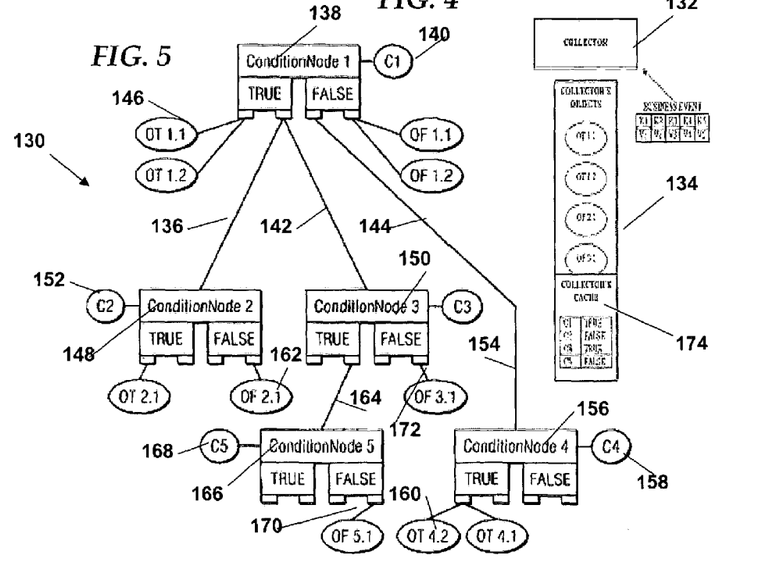
FIG. 5 shows a condition tree object collector according to the teachings of the present invention.

FIG. 5 shows a condition tree 130 and a condition tree object collector (CTOC) 132 according to the teachings of the present invention. As may be seen in FIG. 5, the present invention provides a method and system for externalizing conditional logic in determining aspect objects 134 for an integrated programming architecture. The present invention provides on the one hand a static tree structure 154 consisting of condition nodes and multi-purpose objects and, on the other hand, a dynamic object collector 132. Object collector 132 is instantiated for a particular set of data (e.g., a business event). Upon instantiation, collector cache 174 and set 134 of collected objects for object collector 132 is empty.

Object collector 132 traverses tree structure 130 according to the evaluation result of the condition of the encountered condition nodes. Object collector 132 evaluates each condition for its data (e.g., the business event) and according to the evaluation result, determines which branch, such as branch 136, to follow and which objects, such as objects 134, to collect. To achieve this, object collector 130 collects references to the objects stored in static tree structure 130.

Referring to FIG. 5 in more detail, the object collection process of the present invention may begin at ConditionNode 1 138. Object collector 132 starts traversing the tree structure 130 at ConditionNode 1 138 and tests condition C1 140 as to whether the statement is TRUE for the object collector 132 data. If the statement is evaluated as TRUE, then object collector 132 traverses branches 136 and 142. Otherwise, the statement is evaluated as FALSE and object collector 132 traverses branch 144. Associated with tree structure 130, the objects 146, attached to the traversed branches (e.g., 136 and 142) of tree structure 130, will be collected. Thus, from TRUE branch 136 of ConditionNode 1 138, the associated objects include OT1.1 and OT1.2, in this instance. Objects OT1.1 and OT2.2 would be collected by object collector 132 as part of collected objects 134.

Flow continues along tree structure 130, to ConditionNode 2 148 and ConditionNode 3 150 to test, respectively, Condition C2 152 and Condition C3 154. Note that from FALSE branch 144, objects OF1.1 and OF1.2 would be collected if the evaluation of Condition C1 140 were FALSE. In such instance, flow would move from FALSE branch 144 to ConditionNode C4 156 for testing Condition C4 158. Note further that from ConditionNode 4 156, a TRUE branch 160 results in collecting aspect objects OT4.1 and OT4.2.

In this instance shown, ConditionNode 2 148 tests condition C2 152 to achieve a FALSE result, as collector object table 134 indicates by the collection of false reference to object OF2.1. This FALSE result causes flow to terminate at FALSE branch 162. Had condition C2 152 been tested TRUE, instead, object OT2.1 would have been collected. Now, also from TRUE branch 152, ConditionNode C3 150 tests Condition C3 154 as TRUE, and process flow then goes via TRUE branch 164 to ConditionNode 5 166. ConditionNode 5 166 tests for Condition C5 168 as FALSE. As a result, process flow goes through FALSE branch 170 to collect object aspect OF5.1, as collectors object cache 134 indicates. Had ConditionNode 3 150 tested the statement against ConditionNode C3 154 as FALSE, then process flow would have followed FALSE branch 172 to collect object OF3.1.

FIG. 5, therefore, demonstrates how the conditional tree object collector process combines the functions of tree structure 130 with collector object 132 of the present invention. For a given set of data, the process instantiates object collector 132 for a particular set of facts. A technical advantage of tree structure 130 is the property of being stateless. Therefore, there is no requirement to cache any data in tree structure 130 itself. Object collector 132 itself holds the necessary data, and retains information relating to particular set of data, such as that appearing in collection object table 134. Tree structure 130 need not retain any data about the object traversing it. This allows one single tree structure 130 to be traversed concurrently by multiple object collectors 132. It is, therefore, designed for high performance operations and parallel/concurrent processing.

At the end of process which tree structure 130 and object collector 132 provide, all relevant condition nodes for the particular statement have been traversed. Collector object 132 collects the collected objects 134 and transmits them to the calling application. These objects are objects OT1.1, OT1.2, OF2.1, and OF5.1. Since collector object 132 is created for a particular set of data (e.g., a message), collector object 132 can keep the result of evaluated conditions in memory, while traversing tree structure 130. When the collector object 132 visits a new node, it checks whether the evaluation result is cached. If so, collector object 132 uses that cached result. Otherwise collector object 132 evaluates the condition and stores the evaluation result in collector cache 174.

The present invention, therefore, collects aspect objects and presents them to an external application program. The optimization of the present invention derives from the need to evaluate any condition, such as condition C1 140 of FIG. 5 only once, regardless of the number of times C1 is used. By retaining the evaluation result in collector cache 174, the present invention can direct the logic flow of the associated messages based on the obtained results.

Tree structure 130 of the present invention is self-tuning and permits externalizing conditional statements. With the present invention, it is possible to provide a set of facts in the form of either a key value pair or an array of parameters, wherein each value has a certain name. Upon creating an object collector 132 for these facts traversing tree structure 130 with the created object collector 132, references to objects 152 are stored in collector cache 174.

The collected conditional tree object collector process of the present invention may be used wherever a need exists to externalize conditional statements for associated application programs. Event decomposition within core processing engine 72 permits defining rules for transforming incoming business events into resulting actions, here presented as objects. Thus, a business event may be translated or split-up into one or more aspect objects of different types. In core processing engine 72, aspect objects are then further sent to dedicated processes such as customer balances, general ledger, workflow, data warehouse components. Conditional tree structure 130 defines what target object types are collected given an incoming business event.

Every source-target type combination determines a set of event transformation definition objects. The event transformation definition objects dictate the configuration of tree structure 130. Every event transformation definition object determines how a business event should be transformed into an aspect object. For every attribute in the aspect object, a condition node exists where only one attribute transformation definition object is collected given a source business event. This attribute transformation definition object is then used to calculate/retrieve the correct value for the aspect object within a transformation engine, such as transformation engine 108 of FIG. 4.

The present invention also provides for validation of a set of facts. When a set of facts needs to be validated, condition tree structure 130 may be entered with all rules that apply for a particular set of facts. The multi-purpose objects stored in tree structure 130 would then be exception objects. When the object collector collects at least one exception object, the set of facts is invalid. The present invention further can also be used to validate security rules.

The condition node object gathering process using tree structure 130 and collector object 132 optimizes the evaluation process such that all conditions are evaluated, at a maximum, only once. Also, all conditions that would not apply are not evaluated at all. This is because such conditions are not on the path that arises by virtue of evaluating the message through the tree structure.

Figure 6:
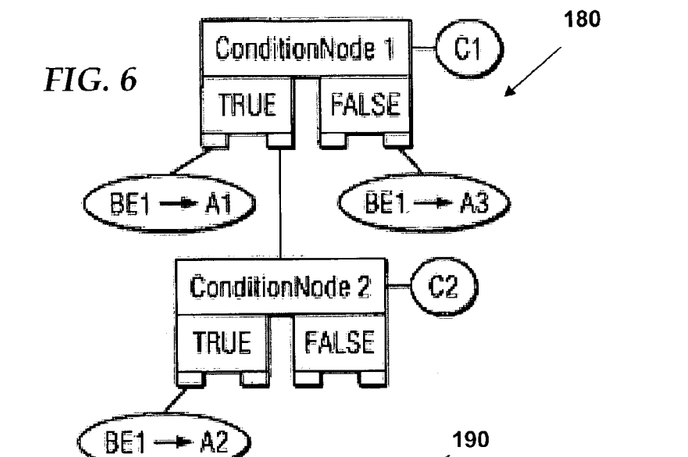
FIG. 6 illustrates certain features of a condition node of the present invention.

FIG. 6 illustrates certain features of a condition node of the present invention. Consider the following rule descriptions for transforming business event BE1 into target aspects:

IF C1 THEN transform BE1 to Aspect1
IF C1 AND C2 THEN transform BE1 to Aspect 2
IF NOT C1 THEN transform BE1 to Aspect 3

Sequentially evaluating these rules implies that C1 will be evaluated three times and C2 will be evaluated even when C1 is FALSE. Organizing the rules in a tree-like structure, as FIG. 6 depicts, will show that C1 will only be evaluated once and C2 will only be evaluated when C1 is TRUE.

The tree structure 180 of FIG. 6, therefore, provides an evaluation process for two condition nodes, ConditionNode 1 and ConditionNode 2, in testing conditions C1 and C2 for the contents of business event BE1. If, in this example, condition C1 is evaluated at ConditionNode 1 to yield a TRUE result, then a target type Aspect1 (or A1) will be collected. Next, condition C2 of ConditionNode 2 will be evaluated. If this results in a TRUE evaluation, target type Aspect2 (or A2) will be added to the object collector's collection of references. On the other hand, if at ConditionNode 1, condition C1 is evaluated to yield a FALSE result, then reference to target type Aspect3 (or A3) will be collected. Thus, the evaluation process 180 may be viewed as the first of steps conducted in decomposition engine 108 for in the operation of event and aspect handler 96 for each business event. A significant process benefit occurs here, because conditions are only evaluated once and only conditions that are on nodes encountered by the object collector are evaluated.

Figure 7A:
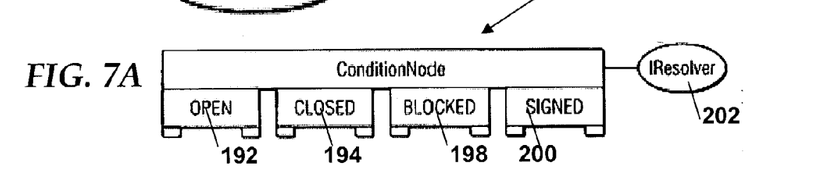
FIGS. 7A and 7B show certain aspects of the switching features of a condition node formed according to the teachings of the present invention.
Figure 7B:
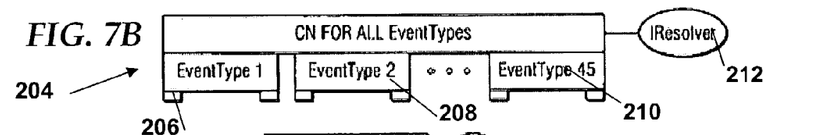

FIGS. 7A and 7B show certain aspects of the switching features of a condition node formed according to the teachings of the present invention. For example, in FIG. 7A, ConditionNode 190 may have different results that include OPEN result 192, CLOSE results 184, BLOCKED results 196 and SIGNED result 200. IResolver 202 serves the function of permitting the resolution of these results. This is distinguished in FIG. 7B where ConditionNode FOR ALL EventTypes 204 provides the results of EventType 1 206, EventType 2 208, or may include as many user events as the situation requires as indicated by EventType N 210. This designation indicates that between EventType 2 208 and EventType N 210, the appropriate EventType 3 through EventType N−1 would be implicit. In both FIGS. 7A and 7B, a condition such as IResolver 202 or 212 would provide the resolution capability as to the particular direction or branch through which the evaluated event would flow.

Figure 8:
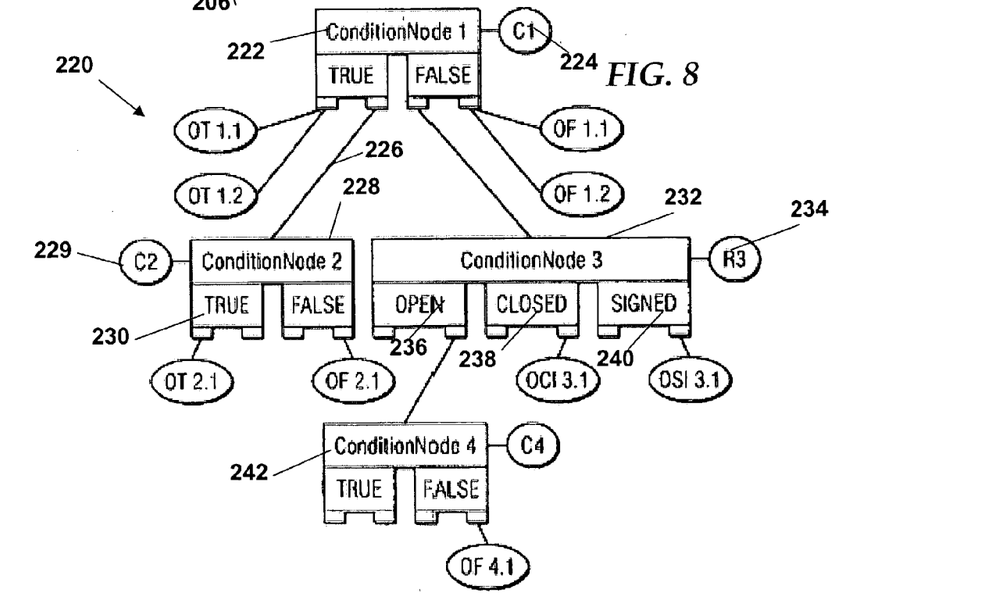
FIG. 8 depicts a conditional tree object collector employing the switching features of the condition node such as depicted in FIGS. 7A and 7B.

FIG. 8 depicts a conditional tree object structure 220 employing the switching features of the condition node such as depicted in FIGS. 7A and 7B including the use of N-ary condition nodes. A conditional tree object structure begins at ConditionNode 1 222, where a set of facts may be evaluated against Condition C1 224. A TRUE result yields object OT1.1 and OT1.2, and causes evaluation to proceed along branch 226 to ConditionNode 2 228. The conditional tree object collector evaluates its facts against condition C2 225, whereby a TRUE result causes collection of object OT2.1, while a FALSE result causes collection of object OF2.1. On the other hand, a FALSE result of Condition C1 224 of ConditionNode 1222 yields collection of objects OF1.1 and OF1.2 and directs evaluation to ConditionNode 3 192 for resolver R3 234 to determine the appropriate result. These appropriate results may be OPEN result 236, for which no object is collected, but for which evaluation proceeds to ConditionNode 4. At ConditionNode 4 242, a TRUE result yields no object, while a FALSE result yields object OF4.1. When ConditionNode 3's resolver R3 234 evaluates the statement to CLOSED 238, object OC3.1 is collected. Alternatively, an evaluation of SIGNED 240 yields the object OSi3.1. The conditional logic depicted in FIG. 8 may be represented as:

```
if C1 then {
    OT 1.1; OT 1.2
    if C2 then {
        OT 2.1
    }
    else {
        OF 2.1
    }
}
else {
    OF 1.1; OF 1.2
    switch (status)
    {
        case (Open) {
            If C4 then
        {
            }
            else {
                OF 4.1
            }
        case (Closed)
        {
            OC1 3.1
        }
```

-continued

```
        case (Signed)
        {
            OSi 3.1
        }
    }
}
```

Figure 9:
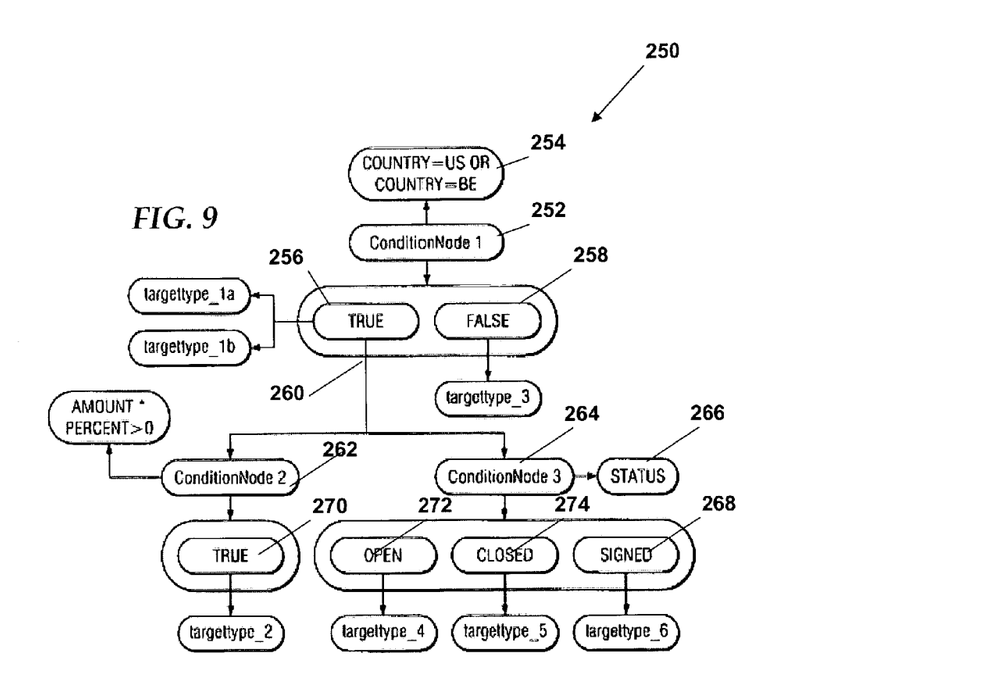
FIGS. 9 and 10 present an exemplary case of using the conditional tree object collector of the present invention.
Figure 10:
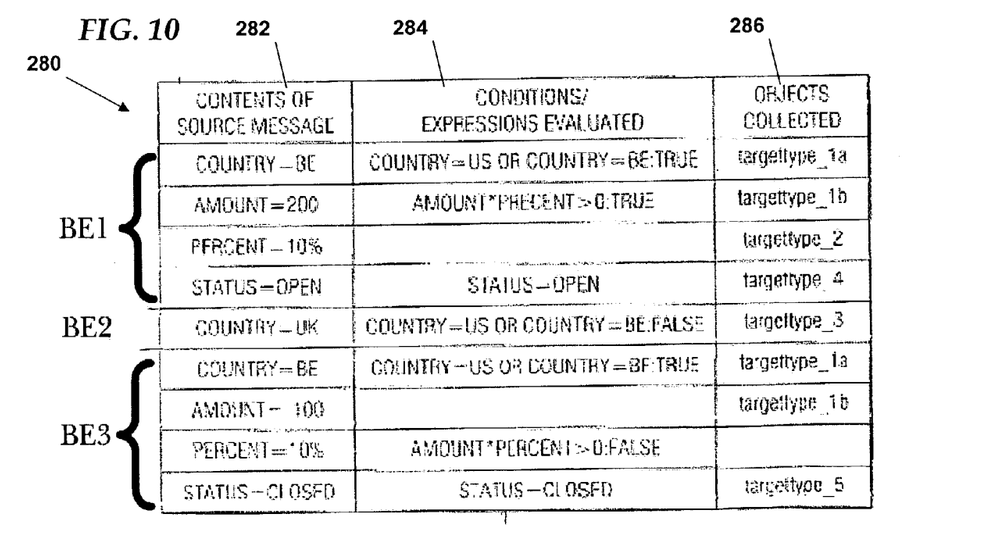

FIGS. 9 and 10 illustrate one example of using the conditional tree object collector process of the present invention. For example, consider the evaluation of logic for a transaction relating to a currency, the amount of a currency conversion and the status of the conversion are tested. Suppose further that the test is such that if the currency is that of the U.S. or Belgium, whether the amount exceeds $200, the applicable percentage is positive or negative, and the status of conversion of interest. Then, a tree structure such as appearing in FIG. 9 and yielding the collected objects of the FIG. 10 table would arise through use of the present invention.

FIG. 9 shows tree structure 250 beginning at ConditionNode 1 252, where there occurs the evaluation of country condition 254. From this evaluation, process flow goes to either TRUE result 256 or FALSE result 258. If ConditionNode 1 254 resolves conditional statement 254 to TRUE result 256, references to targettype_1a and targettype_1b are collected. Alternatively, if ConditionNode 1 252 resolves conditional statement 254 to FALSE result 258, process targettype_3 referenced to is collected, and conditional statement 254 no longer traverses tree structure 250. If conditional statement 254 resolves to TRUE, however, conditional statement 254 continues to traverse branch 260 to ConditionNode 2 262 and ConditionNode 3 264. ConditionNode 2 262 tests whether the amount times the percent is greater than zero. If this is TRUE, then tree structure 250 causes the collection of a reference to targettype_2. ConditionNode 3 264 evaluates against status as indicated by block 266. ConditionNode 3 264 may use an IF-THEN-ELSE structure 272, which may test as to whether the status is OPEN at 272, CLOSED at 274 or SIGNED at block 268. If OPEN 272, the associated aspect object collector collects a reference to the object targettype_4. If CLOSED 274, the object collector collects a reference to targettype_5, and if SIGNED 268, then the collector collects a reference to targettype_6.

FIG. 10 provides a table of source business events BE1, BE2 and BE3, expressions evaluated, and object references collected by the present invention through the example of FIG. 9. FIG. 10 presents table 280, which displays the contents of a source business event in column 282, the condition or expressions to be evaluated in column 284 and references to objects collected by the conditional tree object collector in column 286. Thus, for the contents of business event BE1, the country is Belgium, designated ("BE") and amount is 200, and percent is 10%. With the status of "OPEN," the result that the expression will be evaluated is a test of whether the country is US or country is BE is TRUE. Then, the next condition-expression evaluated is whether the amount times the percentage is greater than zero is TRUE, and, then further, whether the status is OPEN. Object references collected as a result of the evaluations appear in column 236 for this business event and include reference to targettype_1a, targettype_1b and targettype_2.

For business event BE2 containing country code UK, the test of whether the country is the US or Belgium returns a FALSE evaluation. This leads to the process of collecting a reference to targettype_4 as the target, or aspect, object. Finally, business event BE3 includes the data of Belgium as the country, the amount of 100, the percent of 10% and the status of CLOSED. The tree structure 250 evaluation returns a TRUE determination of ConditionNode 1 252, the test of amount [−100] times 10% greater than zero returns a FALSE evaluation at ConditionNode 2 262 and the status is a CLOSED result. As a result, the aspect objects that are collected are targettype_1a, targettype_1b and targettype_5.

Figure 11:
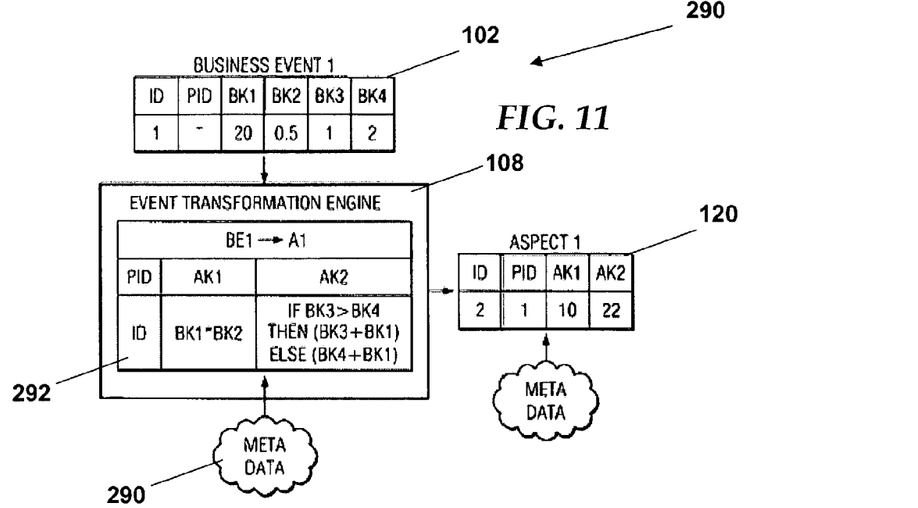
FIG. 11 shows a process of the transformation engine of the present invention.

FIG. 11 further shows process 290 that details by way of example the function of event transformation engine 108. This is the process by which event and aspect handler 96 of FIG. 4 transforms BE1 to Aspect1 120 using the condition tree structure process of the present invention. In transformation process 290, transformation engine 108 includes transformation function 292 that responds to metadata 294 and BE1. The transformation definition of BE1 to Aspect1 consists of a key-value pair map. The key is a name of an attribute of Aspect1 (e.g., PID, AK1) and the value is a condition tree structure containing expression objects. Such an expression object calculates a value given the business event BE1.

The condition tree for Aspect1's PID attribute is:

IF TRUE, THEN ID

An object collector traversing this very simple tree structure will collect the expression ID. Evaluating this expression for business event BE1 basically retrieves the value with the corresponding attribute name, in this instance, the attribute name ID. The result of this expression is then stored in Aspect1's PID attribute.

The condition tree for Aspect1's AK1 attribute is:

IF TRUE, THEN BK1*BK2

Expression BK1*BK2 is collected and the result of this, 10 (=20*0.5), is stored in Aspect1's AK1 attribute. The condition tree for Aspect1's AK2 attribute is:

IF (*BK3*>*BK4*) THEN *BK3*+*BK1* ELSE *BK4*+*BK1*

Expression BK4+BK1 is collected for business event BE1. The result, 22 (=2+20), is stored in Aspect1's attribute.

Figure 12:
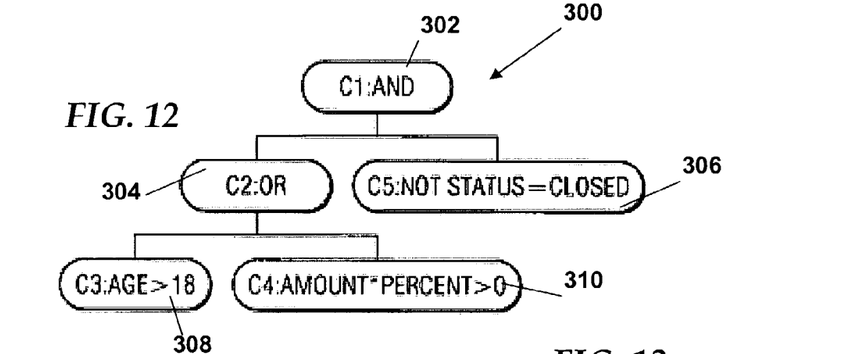
FIGS. 12 through 14 illustrate further characteristics of an example of using the conditional tree object collector of the presenting invention.
Figure 13:
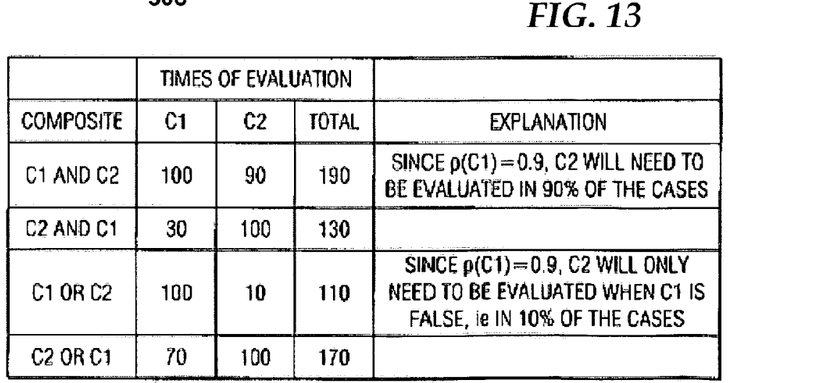
Figure 14:
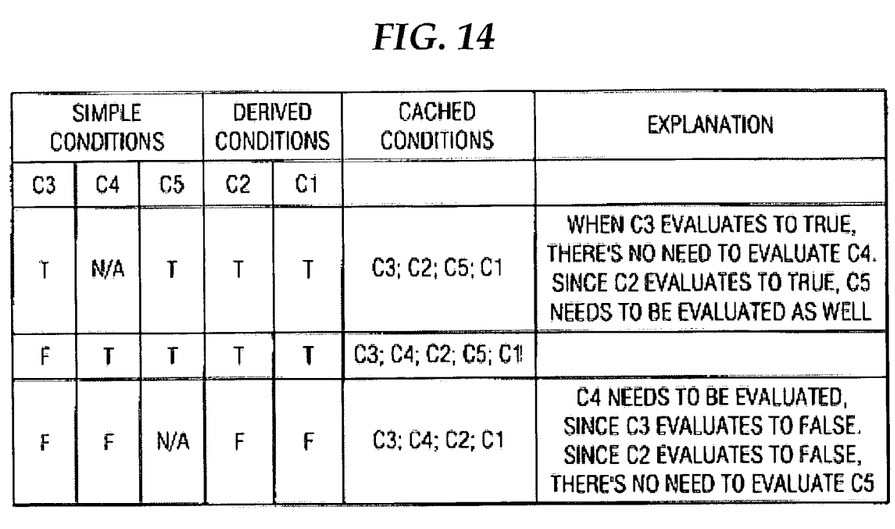

FIGS. 12 through 14 illustrate a further optimization characteristic of an example of using the conditional tree object collector of the presenting invention. Consider the following expression as a condition to be evaluated:

(age>18 OR amount*percentage>10)

AND (NOT STATUS=CLOSED)

This can be broken down as appears in FIG. 12, which shows a composite tree structure 300 beginning with condition C1, which is as an AND condition 302. Branching from AND condition 302 are condition C2 304, which is an OR condition, and condition C5 306, which is a NOT condition. Flowing from condition 304 are condition C3 308 for testing whether age is greater than 18, and condition C4 310, for testing whether the amount times percent is greater than zero. Note that this representation of composite conditions is not a condition node tree structure, but rather a condition node composite structure that holds on to a condition. This condition can be a composite one such as C1, C2 or a simple, non-composite structure such as C3, C4, C5.

With composite tree structure 300, the following rules may apply: When evaluating an AND condition, evaluation stops when one condition in an AND clause is FALSE. When evaluating an OR condition, evaluation stops when one condition in an OR clause is true. Considering a composite tree structure 300, it is often not necessary to evaluate all conditions. Additionally, some conditions may repeat in a condition node tree structure. As a result, these repeating conditions do not need to be evaluated more than once. To optimize the processing of a complete tree structure, the traversing object collector can cache conditions and their results in memory.

Further optimization can be achieved by using historical information from which the probabilities are derived that a particular condition will yield to a certain value. The tuning and optimization of the rules can be automated. With reference to the table of FIG. 13, assume a condition, C1, with a probability of 90% and C2 with a probability of 30%:

$$p(C1)=0.9 \text{ and } p(C2)=0.3$$

The table of FIG. 13 gives an overview of how many times conditions C1 and C2 are evaluated assuming the composite condition is evaluated a hundred times. From the table of FIG. 13, it can be deduced that one can reduce the number of conditions that are evaluated by ordering AND conditions in ascending probability order, and ordering OR conditions in descending probability order. Furthermore, it can be said that $$p(Cx)=1-p(\text{NOT } Cx) \quad (1)$$

and $$p(C1 \text{ AND } C2 \text{ AND } \ldots \text{ AND } Cn)=p(C1)*p(C2)* \ldots * p(Cn); \quad (2)$$

$$p(C1 \text{ OR } C2 \text{ OR } \ldots \text{ OR } Cn)=1-(p(\text{NOT } C1)*p(\text{NOT } C2) \ldots * p(\text{NOT } Cn)) \quad (3)$$

Given all the above, it is possible to optimize every composite condition in the condition node tree structure. The only additional requirement is that whenever evaluating a simple non-composite condition, the process should log condition and the result. Based on these metrics the composite conditions on every condition node can be optimized. Accordingly, the present invention provides a self-optimizing, self-tuning engine for collecting objects for external applications.

FIG. 14 further illustrates the self-tuning aspects of the present invention for composite tree structure 300 such as appears in FIG. 12. With the simple conditions as appearing in the C3, C4, and C5 columns, tree structure 250 yields the derived conditions appearing in columns C2 and C1. The associated results indicate which conditions may be cached for subsequent presentation to an associated application program.

The FIG. 14 table shows the cached conditions for C3 and C5 being TRUE, for C4 and C5 being true and C3 and C4 being FALSE. Note from the table of FIG. 14 that when C3 evaluates to TRUE, there is no need to evaluate C4 in this example. Also, if C2 evaluates to TRUE, then C5 needs to be evaluated. Conversely, when C2 evaluates to FALSE, C5 need not be evaluated. Furthermore, since C3 evaluates to FALSE, C4 need not be evaluated. Note still further that the exemplary evaluation requirements of the FIG. 16 table are only illustrative. The principal point being demonstrated here, of course, is that by virtue of the conditional logic of a tree structure, such as tree structure 250, the present invention provides a most efficient way to externalize conditional statements. This assures a maximum degree of responsiveness and flexibility in the use of software applications appearing in an integrated architecture.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

We claim:

1. A system for externalizing conditional logic in an integrated application architecture, comprising:
    a collector object that receives an external event and transforms said external event into a plurality of aspect objects referenced accordingly to a predetermined set of logical rules, the collector object including an event and aspect handler engine; and
    a tree structure for organizing said set of logical rules, said tree structure comprising:
        a plurality of condition nodes for associating with said collector object and evaluating said external event;
        a condition object associated with each of said condition node against which each of said condition nodes evaluates said external event to generate a plurality of results,
    wherein the plurality of results is associated with each of said condition nodes for association with the evaluation of said external event against said condition node;
        a plurality of aspect objects references associated with selected ones of said plurality of results, said aspect object references for being collected by said collector object; and
        a plurality of branches associated with said plurality of results for directing the sequence by which said collector object traverses said tree structure in response to the evaluation of said external event against said condition node,
    wherein the event and aspect handler engine includes
        a decomposition engine for generating a set of decomposition instructions for decomposing a set of external events into a set of aspect object references in response to the evaluation of said external event against said condition object,
        a transformation engine for receiving said decomposition instructions and transferring said decomposition instructions in a corresponding set of event transformation definitions,
        a grouping engine for receiving said set of event transformation definitions and generating there from a set of grouping instructions for grouping associated aspect object for references of predetermined destinations of said tree structure, and
        a dispatching engine for dispatching said aspect object references to a collector cache.

2. The system of claim 1, wherein the collector cache stores said plurality of aspect objects as said collector traverses said tree structure.

3. The system of claim 1, wherein said condition node comprises an IF-THEN condition node.

4. The system of claim 1, wherein said condition node comprises an IF-THEN-ELSE condition node.

5. The system of claim 1, wherein said condition node comprises a SWITCH condition node.

6. The system of claim 1, wherein said tree structure comprises a configuration for a set of logical AND rules.

7. The system of claim 1, wherein said tree structure comprises a composite configuration for a set of logical OR rules.

8. The system of claim 1, wherein said external event comprises a business event.

9. The system of claim 8, wherein said business event is associated with an integrated enterprise architecture.

10. The system of claim 1, wherein said tree structure is configured to minimize the number of evaluations occurring as said collector object traverses said tree structure.

11. A method for externalizing conditional logic in an integrated application architecture, comprising the steps of:
   receiving an external event and transforming said external event into a plurality of aspect objects referenced accordingly to a predetermined set of logical rules using a collector object; and
   organizing said set of logical rules, using a tree structure for performing the steps of:
   associating said collector object with a plurality of condition nodes and
   evaluating said external event against a condition object in a corresponding condition node to generate a plurality of results,
   wherein the plurality of is associated with the evaluation of said extend event against said condition node;
   collecting with said collector object a plurality of aspect objects references associated with said plurality of results;
   directing the sequence by which said collector object traverses said tree structure in response to the evaluation of said external event against said condition node using a plurality of branches associated with said plurality of results; and
   using said collector object as an event and aspect handler engine according to the steps of
      generating a set of decomposition instructions using a decomposition engine for decomposing a set of external events into a set of aspect object references in response to the evaluation of said external event against said condition object,
      receiving said decomposition instructions using a transformation engine and transferring said decomposition instructions in a corresponding set of event transformation definitions,
      receiving said set of event transformation definitions using a grouping engine and generating therefrom a set of grouping instructions for grouping associated aspect object for references of predetermined destinations of said tree structure, and
      dispatching said aspect object references to a collector cache using a dispatching engine.

12. The method of claim 11, wherein the collector cache for stores said plurality of aspect objects as said collector traverses said tree structure.

13. The method of claim 11, further comprising the step of evaluating said external statement within said condition node using an IF-THEN condition node.

14. The method of claim 11, further comprising the step of evaluating said external statement within said condition node an IF-THEN-ELSE condition node.

15. The method of claim 11, further comprising the step of traversing said tree structure as a set of logical AND rules.

16. The method of claim 11, further comprising the step of traversing said tree structure as a set of logical OR rules.

17. The method of claim 11, further comprising the step of receiving said external event as a business event.

18. The method of claim 17, further comprising the step of receiving said business event as a part of an integrated enterprise architecture.

19. The method of claim 11, further comprising the step of configuring said tree structure for minimizing the number of evaluations occurring as said collector object traverses said tree structure.

* * * * *